United States Patent [19]

Akiyama et al.

[11] Patent Number: 4,965,781
[45] Date of Patent: Oct. 23, 1990

[54] DATA READING DEVICE HAVING SERVO CONTROLLED POSITION RESET

[75] Inventors: Tohru Akiyama; Takashi Okano, both of Saitama, Japan

[73] Assignee: Pioneer Video Corporation, Yamanashi, Japan

[21] Appl. No.: 495,930

[22] Filed: May 19, 1983

[30] Foreign Application Priority Data

May 19, 1982 [JP] Japan .................. 57-84407

[51] Int. Cl.$^5$ ............................. G11B 7/09
[52] U.S. Cl. .................. 369/44.35; 369/44.37; 358/342
[58] Field of Search ................ 369/44–46, 369/43, 54, 55, 111; 250/201 DF, 202, 201.1; 358/342

[56] References Cited

U.S. PATENT DOCUMENTS

| | | | |
|---|---|---|---|
| 3,975,630 | 8/1976 | Zorn | 250/202 |
| 4,065,786 | 12/1977 | Stewart | 369/46 |
| 4,236,232 | 11/1980 | Jansen et al. | |
| 4,239,942 | 12/1980 | Van Alem et al. | 369/43 |
| 4,243,850 | 1/1981 | Edwards | 369/46 |
| 4,273,998 | 6/1981 | Kanamaru | 250/204 |
| 4,290,132 | 9/1981 | Kotaka | 369/45 |
| 4,330,880 | 5/1982 | Van Dijk | 369/32 |
| 4,432,083 | 2/1984 | Hsieh et al. | 369/44 |
| 4,467,462 | 8/1984 | Shibata | 369/45 |
| 4,475,182 | 10/1984 | Hosaka | 369/45 |
| 4,484,319 | 11/1984 | Koishi et al. | 369/46 |
| 4,494,154 | 1/1985 | Akiyama | 358/342 |
| 4,497,048 | 1/1985 | Kimura | 369/46 |

OTHER PUBLICATIONS

Graf, Modern Dictionary of Electronics, 1978, p. 433.

Primary Examiner—Donald McElheny, Jr.
Assistant Examiner—W. R. Young
Attorney, Agent, or Firm—Sughrue, Mion, Zinn Macpeak & Seas

[57] ABSTRACT

In a data reading device of the type in which a servo loop controls the movement of a reflection mirror to control the position of the data detection point, a second servo loop is used to return the mirror to its initial position when the amount of deflection of the mirror exceeds a predetermined range.

11 Claims, 3 Drawing Sheets

FIG. 1 PRIOR ART
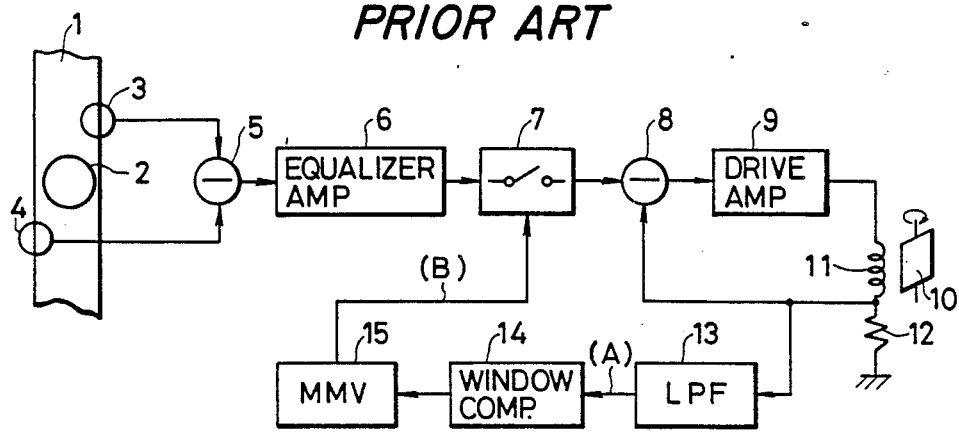
FIG. 2A PRIOR ART
FIG. 2B PRIOR ART
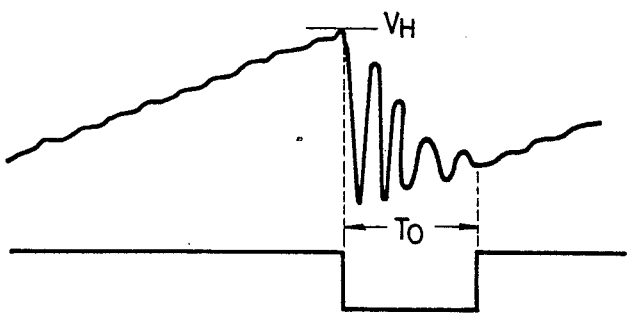

FIG. 3
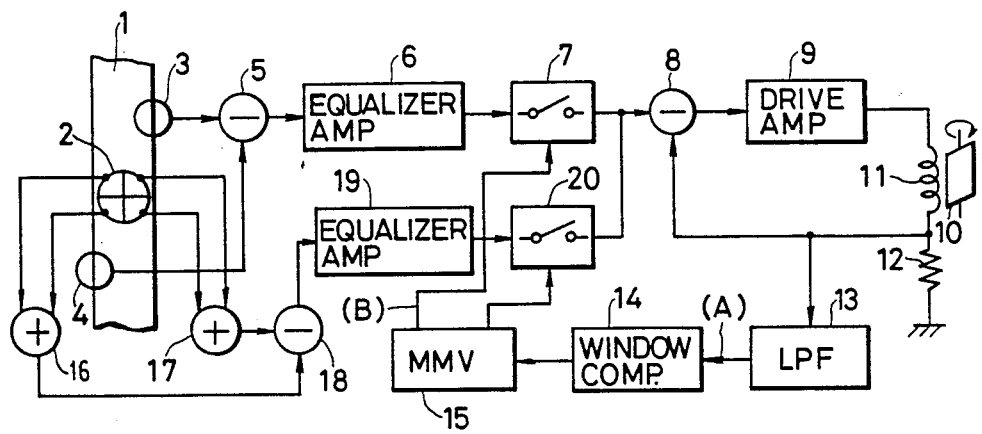
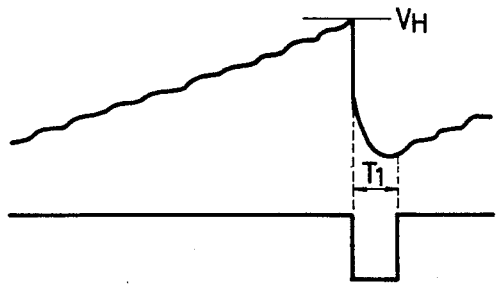
FIG. 4A
FIG. 4B

DATA READING DEVICE HAVING SERVO CONTROLLED POSITION RESET

BACKGROUND OF THE INVENTION

This invention relates to data reading devices, and more particularly to a data reading device with a servo system adapted to perform the position control of a pickup data detection point.

In data reproduction devices, particularly in optical data reading devices, a so-called "tracking servo device" is employed in order to allow the data detection point of a pickup to accurately follow a record track on a recording surface. Furthermore, in order to correct the time axis of reproduction data, it is necessary to control the movement of the data detection point in the record track's tangential direction. For this purpose, a so-called "tangential servo device" is used.

The former tracking servo device will be described with reference to an optical data reading device. FIG. 1 is a block diagram showing the tracking servo device. In FIG. 1, reference numeral 1 designates a part of one record track on a recording surface; and 2, 3, and 4 designate light receiving elements for photoelectric conversion. In the optical data reading device, a spot of light is formed on the recording surface as the data detection point, and detects the optical data from the reflected light beam. More specifically, the light receiving element 2 is to receive a data detecting light beam (not shown) reflected from the recording surface, and the light receiving elements 3 and 4 are to receive tracking error generating light beams (not shown) reflected from the recording surface. When the data detecting light beam is on the center line of the record track 1, its reflected light beam is aligned with the center of the light receiving element 2, while the tracking error generating light beams are positioned on both side lines of the track and their reflected light beams are aligned with the centers of the light receiving elements 3 and 4, respectively.

Therefore, the shift of the data detecting point in a direction perpendicular to the record track 1 can be determined by detecting the difference between the outputs of the light receiving elements 3 and 4 with a subtractor 5. The output of the subtractor 5, which represents the amount of shift, is applied through an equalizer amplifier 6 and a loop switch 7 to a subtractor 8. The output of the subtractor 8 is amplified by a drive amplifier 9, as a result of which the latter produces a drive signal which is applied to a drive coil 11 adapted to control the deflection angle of an actuator, namely, a tracking mirror 10. The data detecting point can be moved in a direction perpendicular to the track by controlling the deflection of the tracking mirror 10. Current flowing in the coil 11 is detected by a resistor and inputted into the subtractor, thereby forming a feedback loop to stabilize the system.

On the other hand, the drive signal applied to the drive coil 11 is received be an LPF (low-pass filter) 13. The output (A) of the LPF is subjected to level decision by a window comparator 14. When the LPF output (A) exceeds a predetermined level range, the comparator 14 provides a detection output. The generation of the detection output triggers an MMV (monostable multivibrator) 15 which provides a single output (B) having a predetermined time width ($T_0$) For the duration ($T_0$) of the single output, the loop switch 7 is open and the tracking servo loop is open.

In the arrangement in FIG. 1, the loop switch 7 is ordinarily turned on during reproduction. Therefore, the tracking servo loop operates normally, and the data detecting point accurately follows the record track at all times. In order to retrieve record data, the pickup is sometimes quickly moved radially of the recording disk; i.e., a so-called scanning operation is carried out. In this case, the pickup is quickly moved with the tracking servo loop closed (on). However, since the angle of deflection of the tracking mirror 10 from the neutral point for moving the data detecting point is limited, it is necessary to return the tracking mirror 10 to the neutral point before the limited angle is reached.

For this purpose, the DC component of the drive signal of the coil 11 is detected by the LPF 13, the MMV 15 is triggered when the DC component reaches the upper limit value $V_H$ of the window comparator 14 as shown in FIG. 2A, and the servo loop is opened only for the duration $T_0$ of the single pulse (FIG. 2B) outputted by the MMV, so that the mirror 10 is naturally returned to the neutral point. The period of time ($T_0$) which is long enough for the mirror to return to the neutral point is set by the MMV 15. After this period of time, the servo loop is closed again, so that the scanning operation is carried out while the tracking operation is being effected.

In the above-described method, the drive signal to the coil 11 is zeroed when the mirror is returned to the neutral point. Therefore, for instance in the case where the quality factor Q of the actuator including the mirror is high at its resonance frequency, the motion of returning the mirror to the neutral point is a damping and vibrating motion, and accordingly it takes a relatively long period of time until the mirror stops completely.

This phenomenon occurs not only in the tracking servo system but also in the tangential servo system. That is, if the DC component of the time axis error of the reproduction signal is superposed during the scanning operation, it is necessary to open the tangential servo loop before the angle of deflection of the tangential mirror reaches the limit value, to thereby return the mirror to the neutral point. In this case also, the mirror is naturally returned merely by turning off the servo loop switch. Therefore, it takes a long period of time until the mirror returns to the neutral point.

The same difficulty occurs not only with the optical data reproducing device but also with other devices such as for instance an electrostatic type data reproducing device.

SUMMARY OF THE INVENTION

An object of this invention is to provide a data reading device in which an actuator is adapted to move the data detecting point, and the time required for returning the amount of deflection of the actuator to the initial value in a scanning operation or the like is reduced.

The data reading device according to the invention comprises means for opening a servo loop in a servo system for moving the position of the data detecting point of a when the amount of deflection, from a predetermined position, of an actuator adapted to move the position of the data detecting point exceeds a predetermined range; and means for producing a signal corresponding to the amount of deflection of the actuator, and allowing the signal to drive the actuator when the servo loop is opened, to control the amount of deflection to the initial value.

BRIEF DESCRIPTION OF THE DRAWINGS

This invention will be described with reference to the accompanying drawings, in which:

FIG. 1 is a block diagram showing a conventional tracking servo system;

FIG. 2 (A,B) is a waveform diagram for a description of the operation of the system in FIG. 1;

FIG. 3 is a block diagram showing a first embodiment of the invention;

FIG. 4 (A,B) is a waveform diagram for a description of the operation of the first embodiment of the invention.

DETAILED DESCRIPTION OF THE PREFERRED EMBODIMENTS

Figure 5:
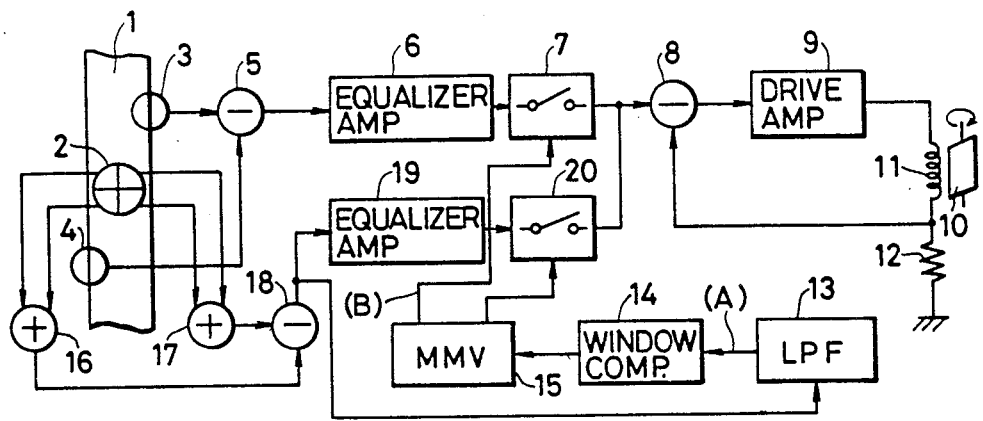
FIGS. 5 and 6 are block diagrams showing second and third embodiments of the invention, respectively.

FIG. 3 is a block diagram showing a first embodiment of the invention, which is a tracking servo device in an optical data reading device. In FIG. 3, parts corresponding functionally to those already described with reference to FIG. 1 are designated by corresponding reference numerals or characters. In this embodiment, the data detecting light receiving element 2 is a so-called "four-division element". The four-division element 2 has four light receiving surfaces which are defined by two dividing lines which are perpendicular to each other as shown in FIG. 3. These four light receiving surfaces are the light receiving surfaces of four photo-electric conversion elements. One of the dividing lines is in parallel with the track, and the other is perpendicular thereto. The sum of the outputs of the four light receiving surfaces is provided as a data detection output; however, the specific method of providing the output is well known and does not constitute a part of this invention and therefore will not be described in detail here.

The sums of the outputs of the light receiving surfaces on either side of the dividing line in parallel with the track are provided by adders 16 and 17, respectively. The difference between the output sums is calculated by a subtractor 18. The subtraction output is applied through an equalizer amplifier 19 and another loop switch 20 to the subtractor 8. The loop switches 7 and 20 are turned on and off by a pair of true forward and complement reverse outputs of the MMV 15 in such a manner that when one of the switches is turned on, the other is turned off.

Similarly, as in the case of FIG. 1, in the reproduction operation, the loop switch 7 is turned on while the loop switch 20 is turned off, so that the tracking servo operation is carried out accurately.

As the scanning operation is carried out, a waveform having a gradually increasing DC component as shown in FIG. 4A appears at the output of the LPF 13. When this signal reaches the upper limit value $V_H$ of the window comparator 14, the MMV 15 is triggered to output a single pulse having a predetermined time width, as a result of which the switch 7 is opened and the servo loop is opened. The above-described operation is completely the same as that in FIG. 1. In this operation, however the loop switch 20 is turned on and, accordingly, the output of the equalizer amplifier 19 becomes the drive signal to the coil 11.

In the ordinary reproduction operation, the center of the reflected data detecting light beam is on the average aligned with the center of the light receiving surfaces of the light receiving element 2, and therefore the output of the subtractor 18 has an average value of zero. In the scanning operation, as long as the tracking servo loop is closed, the angle of deflection of the mirror 10 is gradually increased so that the light beam follows the same track. Accordingly, the position of the center of the reflected light beam on the light receiving surface of the light receiving element 2 is gradually displaced in a direction perpendicular to the track in response to the angle of deflection of the mirror, while the output of the subtractor 18 goes in the positive direction or in the negative direction. The subtraction output represents the amount of deflection of the mirror 10. This signal is applied to the coil 11 when the tracking servo loop is open, and accordingly a new servo loop for zeroing the signal is formed. As a result, the mirror 10 is quickly returned to the initial position, i.e., the neutral point. Thus, as shown in FIG. 4B, the single pulse generation period ($T_1$) of the MMV 15 can be much shorter than that in the case of FIG. 1.

FIG. 5 is a bock diagram showing a second embodiment of the invention. In FIG. 5, those components which have been described with reference to FIG. 3 are therefore designated by the same reference numerals or characters. The second embodiment is different from the first embodiment in that the output of the subtractor 18 is employed as an input to the LPF 13. The second embodiment utilizes the fact that, since the average output of the subtractor 18 is equivalent to the amount of deflection of the mirror 10, the waveform of the DC component of the subtractor output is similar to that in FIG. 4A.

Figure 6:
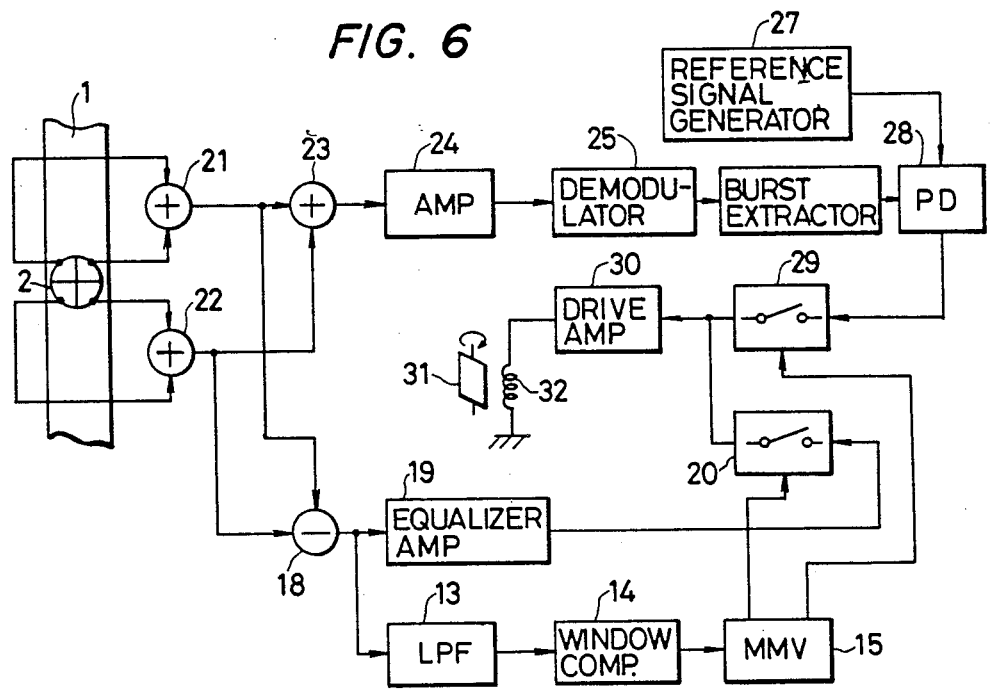

FIG. 6 is a block diagram showing a third embodiment of the invention, which is a tangential servo device in an optical data reading device. The sum of the outputs of the data detecting four-division light receiving element is obtained by adders 21, 22 and 23. The output of the adder 23 is amplified by an amplifier 24 and is then applied to a demodulator 25. The demodulated color burst signal in the color video signal is extracted by a burst extractor 26 and is applied to a phase comparator, or detector, 28, where it is compared with a reference signal from a reference signal generator 27. The phase comparison output of the phase comparator 28 is applied through a loop switch 29 to a drive amplifier 30, which in turn outputs a drive signal for a drive coil 32 which operates to control the rotation of a tangential mirror 31. The rotation of the tangential mirror 31 controls the movement of the data detecting light spot in the track's tangential direction, thus compensating for the time axis variation of the reproduction signal.

When a so-called "drop-out phenomenon" occurs during data reproduction or when the scanning operation is effected, the time axis error of the reproduction signal is increased abruptly and the average deflection of the tangential mirror 31 is increased. Accordingly, the displacement of the light beam in the track's tangential direction is increased, and therefore the position of the center of the reflected light beam on the light receiving element is gradually shifted in the direction of the track from the center of the light receiving element. Thus, the average output of the subtractor 18, i.e., the output of the LPF 13, is a DC level output representative of the deviation of the mirror deflection angle from the neutral point. When the DC level output reaches the limit level of the window comparator 14, the MMV 15 is triggered so that a servo loop switch 29 is turned off while a switch 20 is turned on. Since the output of the subtractor 18 is supplied to the coil 32, another servo loop for zeroing the subtraction output is formed, so that the mirror 31 is quickly returned to the neutral position.

In the above-described embodiment, the output of the subtractor 18 is applied to the LPF 13; however, the same effect can be obtained by applying the signal in the coil 32 to the LPF 13 similarly as in the first embodiment.

As is apparent from the above description, the very simple arrangement of this invention can cause the actuator to quickly return to the initial position for movement of the data detecting point according to the invention. Accordingly, the problem of a picture becoming irregular during the scanning operation is eliminated, and the scanning speed can be increased. Even with an actuator having a high quality factor at the resonance frequency, it is returned quickly to the initial position, and therefore it is unnecessary to use a mechanical damper for it.

The technical concept of the invention is similarly applicable to other data reading devices such as, for instance, an electrostatic capacity type data reading device. In this case, an electrode attached to a stylus corresponds to the spot of light, and an actuator of the stylus to the tracking mirror or the tangential mirror.

In the foregoing description, although the spot or the electrode is described as being a data detection point, it is not intended that the spot or the electrode does not have area as defined mathematically but intended that it has minute area.

We claim:

1. A data reading device of the type wherein data is detected from a detection point on a record medium, said device comprising actuating means movable away from an initial position to move the location of said detection point on said medium, drive means for driving said actuating means in response to a driving signal and first means for providing a first signal as said drive signal to said drive means, said device further comprising:

first disabling means for interrupting said first signal when the amount of movement of said actuating means from said initial position exceeds a predetermined value;
   means for generating a second signal having an amplitude corresponding to the amount of movement of said actuating means from said initial position; and
   second means for providing said second signal as said drive signal to said drive means during interruption of said first signal, to thereby move said actuating means back to said initial position.

2. A data reading device as claimed in claim 1, wherein said first means forms a first servo means with said drive means when said first signal is not interrupted and said second means forms a second servo means with said drive means when said first signal is interrupted.

3. A data reading device as claimed in claim 1, wherein the location of said detection point is determined by a spot of light and wherein said first means and said driving means are connected together in a first servo means when said first signal is not interrupted, said first servo means comprising a tracking servo device for moving said spot of light in a direction substantially perpendicular to a record track on said record medium, and wherein said actuating means comprises a tracking mirror.

4. A data reading device as claimed in claim 3, wherein said means for generating said second signal comprises a light receiving surface having a reference position, said light receiving surface receiving said spot of light passed through said record medium and providing as said second signal a signal representative of the deviation of the center of said spot of light from said reference position.

5. A data reading device as claimed in claim 4, wherein said light receiving surface comprises four surface portions separated from one another along two lines which are perpendicular to one another, said four surface portions comprising the light receiving surfaces of four independent photo-electric conversion elements, said means for generating said second signal further including combining means for combining outputs of said photo-electric conversion elements to generate said second signal.

6. A data reading device as claimed in claim 5, wherein said combining means comprises summing means for generating a first sum from the outputs of two of said photo electric conversion elements disposed on the same side of one of said perpendicular lines and for generating a second sum from the outputs of the remaining two of said photo-electric conversion elements disposed on the other side of said one perpendicular line, and difference means for generating a signal corresponding to the difference between sad first and second sums to thereby generate said second signal.

7. A data reading device as claimed in claim 1, wherein the location of said detection point is determined by a spot of light and wherein said first means and said driving means are connected together in a first servo means when said first signal is not interrupted, said first servo means comprising a tangential servo device for moving said spot of light in a direction substantially parallel to a record track on said record medium, and wherein said actuating means comprises a tangential mirror.

8. A data recording device as claimed in claim 7, wherein said means for generating said second signal comprises a light receiving surface having a reference position, said light receiving surface receiving said spot of light passed through said record medium and providing as said second signal a signal representative of the deviation of the center of said spot of light from said reference position.

9. A data reading device as claimed in claim 8, wherein said light receiving surface comprises four surface portions separated from one another along two lines which are perpendicular to one another, said four surface portions comprising the light receiving surfaces of four independent photo-electric conversion elements, said means for generating said second signal further including combining means for combining outputs of said photo-electric conversion elements to generate said second signal.

10. A data reading device as claimed in claim 9, wherein said combining means comprises summing means for generating a first sum from the outputs of two of said photo-electric conversion elements disposed on the same side of one of said perpendicular lines and for generating a second sum from the outputs of the remaining two of said photo-electric conversion elements disposed on the other side of said one perpendicular line, and difference means for generating a signal corresponding to the difference between said first and second sums to thereby generate said second signal.

11. A data reading device of the type wherein data is detected from a data detection point on a record medium, said device including a first servo loop for moving an actuating means to thereby control the position of said data detection point, said device further comprising:

means for generating a first signal representing the amount of movement of said actuating means from a predetermined position;

means for opening said first servo loop when the amount of movement of said actuating means from said predetermined position exceeds a predetermined amount; and a second servo loop, including means for generating a second signal having an amplitude corresponding to the amount of movement of said actuating means from said predetermined position, for moving said actuating means, at a rate dependent upon said second signal, during opening of said first servo loop to return said actuating means to said predetermined position.

* * * * *